United States Patent [19]

Sekoguchi

[11] Patent Number: 4,744,400
[45] Date of Patent: May 17, 1988

[54] PNEUMATIC RADIAL TIRE FOR MOTORCYCLE

[75] Inventor: Masaharu Sekoguchi, Ninomiyamachi, Japan

[73] Assignee: Yokohama Rubber Co., Ltd, Tokyo, Japan

[21] Appl. No.: 893,468

[22] Filed: Aug. 8, 1986

Related U.S. Application Data

[63] Continuation of Ser. No. 590,433, Mar. 16, 1984, abandoned.

[30] Foreign Application Priority Data

Mar. 30, 1983 [JP] Japan ................... 58-54707

[51] Int. Cl.$^4$ .................................................. B60C 9/28
[52] U.S. Cl. ..................... 152/546; 152/538; 152/555
[58] Field of Search ............... 152/542, 538, 546, 543, 152/552, 548, 554, 555, 556

[56] References Cited

U.S. PATENT DOCUMENTS

| | | | |
|---|---|---|---|
| 2,063,105 | 12/1936 | King .......................... | 152/542 |
| 3,442,315 | 5/1969 | Mirtain ....................... | 152/354 |
| 4,185,675 | 1/1980 | Greiner et al. .............. | 152/555 |
| 4,202,393 | 5/1980 | Ikeda et al. ................. | 152/354 R |
| 4,287,929 | 9/1981 | Huinink ...................... | 152/354 |

FOREIGN PATENT DOCUMENTS 1222759 2/1971 United Kingdom .
2102354 2/1983 United Kingdom ............... 152/355

Primary Examiner—Donald E. Czaja
Assistant Examiner—Ramon R. Hoch
Attorney, Agent, or Firm—Finnegan, Henderson Farabow, Garrett and Dunner

[57] ABSTRACT

A pneumatic radial tire for a motorcycle, in which a carcass layer is disposed so as to extend from one of the tire's bends to the other, and belt reinforcing layers are disposed outside the carcass layer at the tread. In this pneumatic radial tire, a cord reinforcing layer is disposed outside the carcass layer so as to extend from a shoulder around the bead and up the tire's side wall, and at least one of the end portion of the cord reinforcing layer on the shoulder side and the turn-up end portion is stacked between the end portions of the belt reinforcing layer and the carcass layer.

5 Claims, 2 Drawing Sheets

PNEUMATIC RADIAL TIRE FOR MOTORCYCLE

This application is a continuation of application Ser. No. 590,433, filed Mar. 16, 1984, now abandoned.

BACKGROUND OF THE INVENTION

This invention relates generally to a pneumatic radial tire for use in a motorcycle, and more particularly to a pneumatic radial tire for a motorcycle in which a cord reinforcing layer is disposed outside a carcass layer of a side wall of the tire in such a fashion that at least one of the end portions of the cord reinforcing layer are stacked with the end portions of belt reinforcing layers, and is turned up around a bead core, in order to improve the driving stability of the motorcycle at the time of cornering.

Tires of a radial structure in general are more excellent than tires of a bias structure in the aspects of abrasion resistance, straight driving stability, cornering performance and fuel consumption, and are widely used as the tires for four-wheel automobiles. When used as the tires for a motorcycle, however, the tires of the radial structure involves the problem of low driving stability required at the time of cornering, and are therefore believed unsuitable for the motorcycle. In other words, tires of a motorcycle generates a large camber angle at the time of cornering, and a side force to match with this camber angle is necessary. In the tires of the radial structure, the cord angle of a carcass layer is substantially 90° in the circumferential direction of the tires, so that a sufficiently high side force cannot be obtained when compared with tires of the bias structure. This results in the problems that the oscillation of the frame of the motorcycle occurs at the time of cornering to reduce the driving stability of the motorcycle.

SUMMARY OF THE INVENTION

In order to obviate the problem described above, the present invention is directed to provide a pneumatic radial tire for a motorcycle, having a construction in which a cord reinforcing layer is disposed along a shoulder of the tire in such a manner that at least one of the end portions of the cord reinforcing layer is stacked with belt reinforcing layers.

It is another object of the present invention to provide a pneumatic radial tire for a motorcycle, exhibiting a high driving stability at the time of cornering.

As will be described below in the embodiment of the invention and illustrated in the accompanying drawings, in a tire of a radial structure in which a carcass layer 16 is disposed so as to extend from one of beads 14 to the other at a cord angle of between 75° and 90° in the circumferential direction of the tire, and belt reinforcing layers 18 are disposed outside the carcass layer 16 at a tread 10, the present invention provides a pneumatic radial tire for a motorcycle which is characterized in that a cord reinforcing layer 24 is disposed outside the carcass layer 16 so that it extends from a shoulder 12 and is turned up and wound around a bead core 15 on the shoulder side, and at least one of the end portion of the cord reinforcing layer 24 on the shoulder side and the turn-up end portion 26 is stacked between the end portions 19 of the belt reinforcing layers 18 and the carcass layer.

Hereinafter, a preferred embodiment of the present invention will be described with reference to the accompanying drawings.

DESCRIPTION OF THE PREFERRED EMBODIMENT

Figure 1:
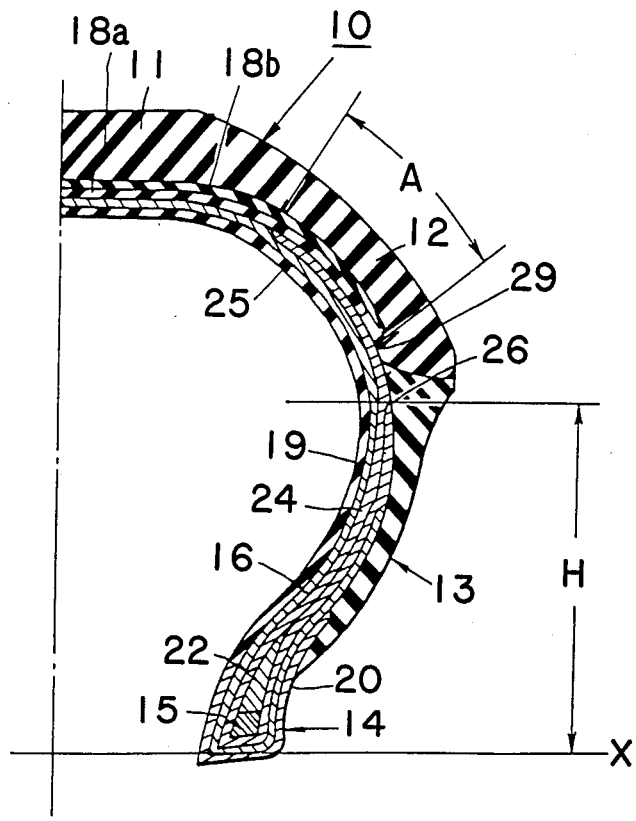
FIG. 1 is a semi-meridian sectional view showing a preferred embodiment of the present invention.

FIG. 1 is a semi-meridan sectional view showing the right half of the tire in accordance with a preferred embodiment of the present invention. In the drawing, reference numeral 10 represents a tread, which consists of a crown 11 at the center and shoulders 12 on the right and left external sides of the crown 10. Reference numeral 13 represents a side wall and reference numeral 14 does a bead. A carcass layer 16 extends from one of the beads 14 to the other, not shown, at a cord angle of between 75° and 90° in the circumferential direction of the tire, and its both end portions are turned up and wound around bead cores 15, respectively. Although the carcass layer shown in the drawing is of a one-ply type, it may consist of a plurality of layers such as two or more layers, whenever necessary. Organic fibers such as nylon, polyester, aromatic polyamide and the like or metal fibers such as steel fibers are used as the cord material of this carcass layer 16.

Two belt reinforcing layers 18a, 18b having a so-called "hooping effect" are wound on the tread 10 outside the carcass layer 16. Organic fibers such as rayon, aromatic polyamide and the like, or metal fibers such as steel fibers are used as the cord material for these belt reinforcing layers 18a, 18b. The cord angle of these layers are between 15° and 30° in the circumferential direction of the tire so that they cross each other. An inner liner 19 for preventing the air leakage is disposed inside the carcass layer 16, and a chafer 20 for preventing the rim chafing is wound on and inside the tire from inside the bead 14 through the bottom. A filler 22 of a rigid rubber is disposed on the bead core 15.

Figure 3:
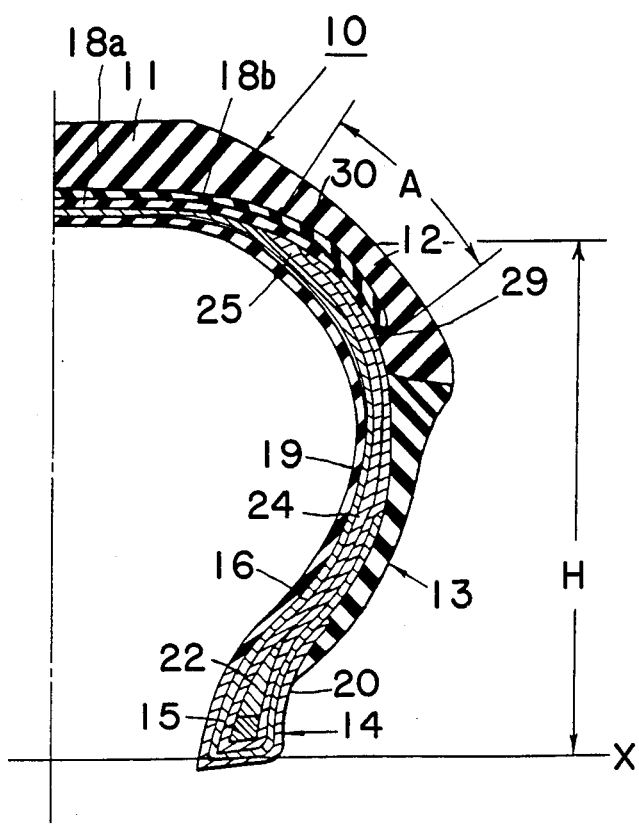
FIG. 3 is a semi-meridan sectional view of a further preferred embodiment of the invention.

A cord reinforcing layer 24 is disposed outside the carcass layer 16 so as to cover the portion ranging from the shoulder 12 to the side wall 13, and is turned up and wound around the bead core 15. The end portion 25 of this cord reinforcing layer on the shoulder side is stacked with the end portions of the belt reinforcing layers 18a, 18b and is interposed between the inner belt reinforcing layer 18a and the carcass layer 16. The width A of the stacking portion of the cord reinforcing layer 24 and the belt reinforcing layers 18a, 18b (the length along the grounding surface of the tread) is selected suitably in according with desired characteristics of the tire, but it must have a height of at least 10 mm from the end portion 29 of the wide belt reinforcing layer (the external belt reinforcing layer 18b in this embodiment). The turn-up height H of the end portion 26 at the turn-up portion of the cord reinforcing layer 24 is also selected suitably in accordance with the desired characteristics of the tire, but where higher rigidity is necessary for the side wall 13, a structure is preferably employed in which the height is further increased towards the shoulder 12 from the height shown in the drawing, so that the end portion 30 is stacked or overlaps with the belt reinforcing layers 18a, 18b in the same way as the end portion 25 on the shoulder side see FIG. 3.

Although those organic or metal fibers which are generally used can be used as the material for the cord reinforcing layer 24, a suitable cord material is preferably selected in accordance with the side force required at the time of cornering.

The cord angle of the cord reinforcing layer 24 is between 20° and 45° in the circumferential direction of the tire, so that the cord cross in mutually opposite directions. The cord angle is set at a position close to the bead 14. If the cord angle is below 20°, molding of the tire becomes difficult and the working property drops. If the cord angle exceeds 45° on the other hand, the reinforcing effect of the side wall drops and the required side force can not be obtained.

Figure 2:
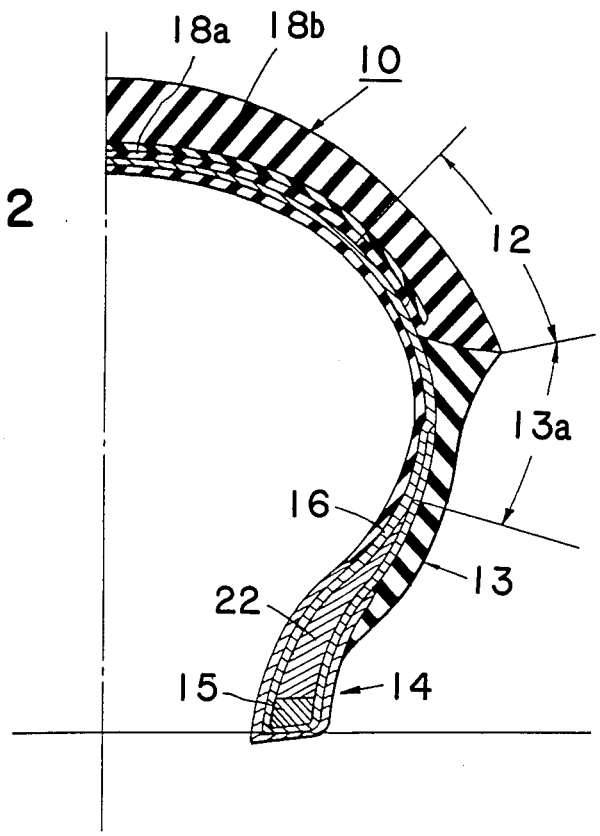
FIG. 2 is a semi-meridian sectional view showing a comparative example for the present invention.

Table 1 illustrates the result of the comparative measurement test of the side force between the tires of the invention using cord reinforcing layers having different kinds of cord materials and those which were not equipped with the cord reinforcing layer (FIG. 2).

The size of the tires used for the test was 120/90-18 65H, the cord material of the carcass layer was nylon, the cord angle was 90° and the number of ply was one ply.

The cord angle of the cord reinforcing layer was 45° in the circumferential direction of the tire at the position in the proximity of the bead so that the cords crossed one another, and the arrangement of the end portion on the shoulder side and the turn-up portion was such as shown in FIG. 1. The width of the stacking portion with the upper belt reinforcing layer was 10 mm.

The belt reinforcing layers, the filler, the chafer and so forth, were also arranged in the same way as illustrated in FIG. 1.

The side force was measured by changing a camber angle from 0° to 40° and determining the dynamic characteristic values in a drum.

The numeric values shown in Table 1 are index values with the measured value of the tires not equipped with the cord reinforcing layer being 100.

TABLE 1

| Cord material of cord reinforcing layer | side force |
| --- | --- |
| nil | 100 |
| nylon | 108 |
| rayon | 115 |
| aromatic polyamide | 130 |
| steel | 140 |

It can be seen clearly from Table 1 that the side force can be remarkably improved by the provision of the cord reinforcing layer.

FIG. 2 illustrates an example of the radial tires which are known generally as the tires not equipped with the cord reinforcing layer. In the tire of this type, a filler 22 consisting of high rigidity tire layer is disposed so as to extend from above the bead core 15 to the portion close to the center of the side wall 13, in order to secure a lateral rigidity of the side wall 13. However, when the camber angle increases, the rigidity drops at the portion ranging from the shoulder 12 to the upper half 13a of the side wall 13. Consequently, the necessary side force can not be secured at the time of cornering.

It can also understood from Table 1 that the magnitude of the side force varies with the kind of the cord material of the cord reinforcing layer. It is therefore desirable to select a suitable cord material of the cord reinforcing layer in accordance with the characteristics required for a motorcycle to which the tire is used. In this manner, the tire characteristics best suited for the characteristics of the motorcycle, to which the tire is used, can be obtained by changing the rigidity of each of the crown, shoulder and side wall of the tire.

Although the cord reinforcing layer of the embodiment described above was of a one-ply type, two- or more plies may be disposed, whenever necessary. The relation of disposition of the end portion of the cord reinforcing layer on the shoulder side and the turn-up end portion on either side need not always be the same as the relation on the other side, and the positions of the end portions of the cord reinforcing layer on the right and left may be different from each other.

As can be understood clearly from the above description according to the present invention, in a tire of a radial structure for a motorcycle in which belt reinforcing layers are disposed outside a carcass layer of a tread, a cord reinforcing layer is arranged outside the carcass layer of the tire in such a fashion that the cord reinforcing layer extends from the shoulder and is turned up around the bead core on the shoulder side, and at least one of the end portions of the cord reinforcing layer is stacked with the end portions of the belt reinforcing layers between the carcass layer and the belt reinforcing layers. Since the present invention increases the rigidity of the side wall of the tire, the tire of the present invention can secure the side force corresponding to a large camber angle at the time of cornering, thereby providing a pneumatic tire of a radial structure for use in a motorcycle having an excellent driving stability at the time of cornering.

In addition, the present invention can make compact the shape of the filler, because the rigidity of the side wall can be improved by the cord reinforcing layer.

What is claimed is:

1. In a radial tire for a motorcycle having a tread portion that includes a crown and rounded right and left shoulder portions, right and left side walls and bead cores and a carcass layer that wraps around said bead cores and extends from one tire bead to the other tire bead and belt reinforcing layers disposed over said carcass layer and extending from one shoulder portion to the other in the tread of the tire, the improvement comprising right and left cord reinforcing layers disposed axially outside of the main carcass layer, a first end of each cord layer overlapping and being stacked between the carcass layer and the lateral ends of the belt reinforcing layers in the shoulder portion of the tread of the tire for a distance of at least 10 mm, the cord layer extending down the side wall from said first end around the bead core on that side of the tire between the main carcass layer and the bead core and back up said side wall of the tire so that said cord layer overlaps the outside of that portion of said cord layer extending down from the shoulder, said cord layer extending back up the side wall to a point where it overlaps and is stacked between said first end of the cord layer and the ends of the belt reinforcing layers in said shoulder portion.

2. The radial tire of claim 1, wherein said cord reinforcing layer is formed from organic or metal fibers.

3. The radial tire of claim 2, wherein said fibers are nylon, rayon, aromatic polyamide or steel fibers.

4. The radial tire of claim 3, wherein said fibers are of aromatic polyamide or steel.

5. The radial tire of claim 1, wherein said cord reinforcing layers have a cord angle of 20° to 45° in the circumferential direction of the tire.

* * * * *